April 23, 1968     R. O. FALLER     3,378,925
TOOTH SHADE GUIDE
Filed July 14, 1965
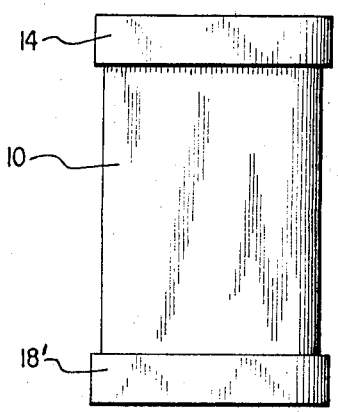
FIG. 1
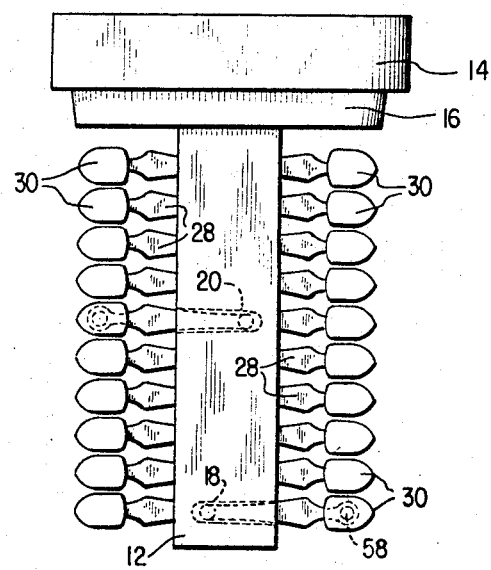
FIG. 2
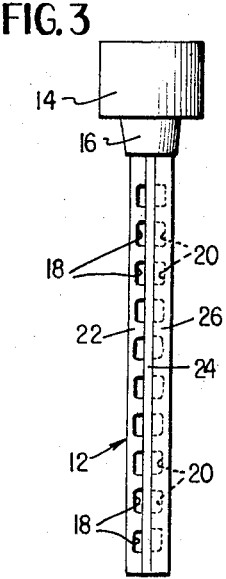
FIG. 3
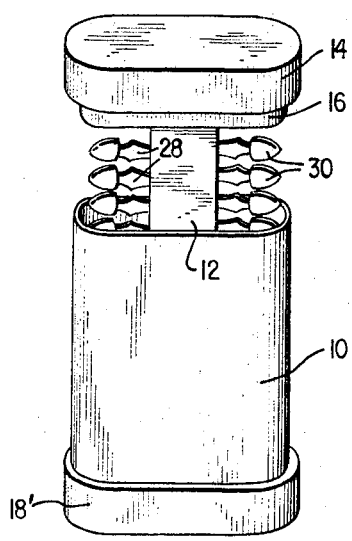
FIG. 4
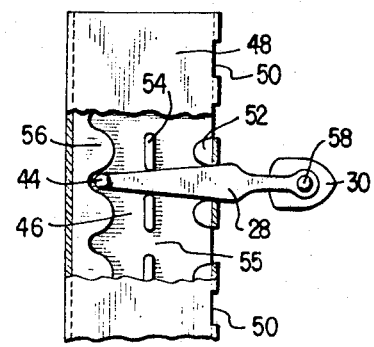
FIG. 7
FIG. 5
FIG. 6
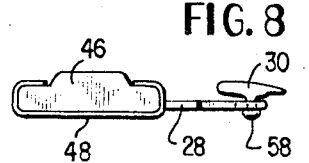
FIG. 8
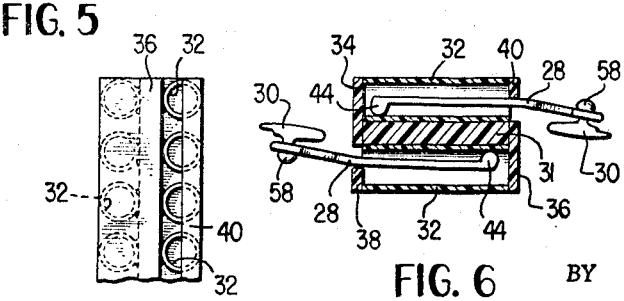
INVENTOR
ROBERT O. FALLER
BY *a. a. Saffitz*
ATTORNEY United States Patent Office 3,378,925
Patented Apr. 23, 1968

3,378,925
TOOTH SHADE GUIDE
Robert O. Faller, Buffalo, N.Y., assignor to Williams Gold Refining Company, Buffalo, N.Y., a corporation
Filed July 14, 1965, Ser. No. 471,937
2 Claims. (Cl. 32—71)

ABSTRACT OF THE DISCLOSURE

A tooth shade guide assembly comprising a tank filled with a desired liquid, a closure therefor and a support to hold the shade guide elements within the tank secured to the closure. The support comprises a center wall member having secured thereto on each side an end member with transverse slots, the wall closing off the slots to form a series of openings disposed on each side of the wall. The shade guide elements are thus supported in the openings. To hold the elements securely within the openings, the walls of the slots are somewhat flexible and the dimensions of the opening are slightly less than that of the portion of the elements inserted in the openings. To further increase the holding effect, the portions of the elements within the openings are outwardly tapered so that a jamming action results.

---

This invention relates generally to shade guide units for use by dentists in determining the correct shade or color of the artificial tooth or teeth to be substituted for the natural tooth or teeth of a patient. The invention is particularly directed to shade guides having teeth of a plastic material although it is also ideally suited to those incorporating porcelain teeth.

It is of course desirable to secure the closest possible color match between the artificial tooth or teeth and the natural teeth. However, when dealing with plastic shade guide teeth, there has been an inherent problem due to the fact that many plastics tend to change color in the course of time. Two primary contributing factors to this color change are the natural aging of the plastics and the effect that light has on the plastics.

Another factor to be considered in securing an accurate color match is the fact that many materials, including plastics and porcelain, appear to be of one shade when in dry condition but are of a slightly different shade when in a moistened or wet condition. Since the teeth of a patient are normally in a moistened condition when a shade match is being determined by the dentist, it is important that the shade guide teeth be in a moistened condition also when a comparison is being made. This factor has been overlooked or disregarded by some dentists; but when it has been considered, it has required the dentist to be inconvenienced by going through the additional step of moistening the shade guide teeth.

In addition, there usually has been no provision for storing a shade guide to keep it in a condition such that it is dirt-free and dust-free which is a factor in determining as exact color match. Also, there usually has been no provision for keeping prior shade guides in a sterilized condition. Because shade guides are used so close to the mouth, a sanitary shade guide is a necessity for preventing infection of a patient.

It is therefore a primary object of this invention to provide a shade guide that is retained in a clean, sterilized condition for securing an accurate shade match and for preventing transmittal of germs to a patient.

It is another object to provide an arrangement wherein the shade guide teeth are shielded from light rays so as to retard color changes thereof.

It is a further object to provide means for supporting a shade guide and for protecting it from possible damage from physical contact during storage thereof.

It is a further object to provide a shade guide that is retained in a moistened condition so as to provide a better basis for comparison with the teeth in the mouth of a patient.

Other objects and advantages will become apparent from the following description when taken in conjunction with the drawings, wherein:

FIG. 1 is a front view of the shade guide unit of this invention in a storage condition;

FIG. 2 is an inverted front view of one embodiment of the shade guide of this invention;

FIG. 3 is an end view of the shade guide of FIG. 2 with the shade guide teeth withdrawn;

FIG. 4 is a perspective view of the shade guide unit of this invention with the shade guide of the embodiment shown in FIGS. 2 and 3 partially withdrawn from storage position;

FIG. 5 is an upright partial end view of a second embodiment of the shade guide of this invention with the shade guide teeth withdrawn;

FIG. 6 is a section of the shade guide of FIG. 5 with the shade guide teeth in position;

FIG. 7 is a partial upright rear view of a third embodiment of the shade guide with a portion broken away and with a single shade guide tooth in position; and, FIG. 8 is a top view of the shade guide of FIG. 7.

By this invention, the shade guide, when not in use, is kept in a mechanically resistant plastic tank 10 which is either clear or opaque and which contains a cold, disinfectant solution. The tank is preferably of one-piece construction having a supporting base 18'. The shade guide is positioned in the tank in an inverted position with a base portion 14 thereof acting as a lid to prevent entry of undesirable dust, dirt, microorganisms and the like. The base portion 14 of the shade guide is preferably opaque for preventing light from entering the interior of the tank, but it may also be translucent or even transparent. The base portion 14 also facilitates easy withdrawal of the shade guide and after withdrawal functions as a support permitting the shade guide to be placed upright upon a horizontal surface.

The tank 10 is fabricated from a durable plastic such as cellulose acetate, polyvinyl chloride, polystyrene, polyethylene, or polypropylene. Almost any plastic could be used as well as certain metals, with the major consideration being that it is mechanically resistant to impact and not affected by the sterilizing solution which may be hypochlorite, alcohol, hexachlorophene, formaldehyde, pentacresol, merthiolate or benzalkonium chloride, for example.

The shade guide of FIGS. 2 and 3 generally comprises the aforementioned base 14, a seal portion 16 which may be slightly beveled as seen in FIG. 3 and which is adapted to enter the top portion of the tank with a close fit to prevent evaporation of the sterilizing solution and entry of dust and the like, and a shank 12 which may be of plastic materials and which is composed of a lamination of slotted layers 22 and 26 and an intermediate layer 24. The above-described structure may be fabricated by conventional molding and bonding techniques from synthetic thermoplastic materials such as cellulose acetate, polyvinyl chloride, polystyrene, polyethylene, polypropylene, acrylic resin (Lucite), cellulose propionate and high impact copolymer of styrene and acrylonitrile. A series of spaced, transversely extending slots 18 are formed in the layer 22, one of which is shown as hidden by dotted lines in FIG. 2. The slots extend from one edge surface of the layer and may terminate before reaching the opposite edge, as shown in FIG. 2, or they may extend all the way through to the opposite edge. A series of similar slots 20, one of which is seen in FIG. 2, are formed in the layer 26 except that they extend from the opposite edge surface and preferably terminate before reaching the first mentioned edge surface. The intermediate layer 24 serves as a wall between the slots 18 and 20.

Disposed within the slots, as seen in FIG. 2, are the shade guide teeth, each consisting of a support arm 28 which is preferably of a flexible plastic material and the tooth 30 which is also preferably plastic as described above. The teeth are secured to the arms 28 by formations 58 which extend through apertures in the arms. The connection is such that the teeth may be manipulated or rotated relative to the arms with the formations acting as pivots. The ends of the arms opposite to the teeth are each formed with a protuberance 44, as seen in FIG. 6, during the fabrication thereof. The protuberances provide a degree of frictional contact with the walls of the slots to prevent dislodgement of the teeth from the slots and they also effect proper alignment of the arms within the slots. The slots 18 and 20 are configured and dimensioned in order to offer a degree of frictional resistance and the fit may be such that the arms 28 are slightly bent due to the force of engagement of the protuberances 44 with the side walls of the slots when the arms are fully inserted.

In order to accentuate the frictional contact, the walls of the slots against which the protuberances 44 are adapted to engage may be formed so that they converge slightly (not shown) relative to the opposite walls which are provided by the intermediate layer 24.

It is noted that the arms 28 as seen in FIG. 7, for example, increase in width progressively from the ends opposite the teeth in the direction of the teeth. The purpose for this is to provide an additional frictional fit with the slots to align and retain the arms within the slots. It is apparent that as the arms are inserted into the slots a point will be reached where the edges of the arms will engage the edges of the slots, thus preventing further entrance of the arms. Therefore, it is seen that duel means are provided for aligning and resisting withdrawal of the arms. It is within the scope of this invention to eliminate either of the above-mentioned frictional features or to provide both.

FIGS. 5 and 6 show an alternate embodiment of the shade guide comprising a shank 31 which is secured to a base such as the one seen in FIG. 2, for example, and having tubular elements 32 secured thereto on both sides thereof. The ends of the tubular elements are closed off by strips 34 and 36 which are secured to both the shank and the tubular elements. Additional strips 38 and 40 are provided so that the arms 28 may be better aligned in a vertical plane. Fabrication of this embodiment may be by conventional molding techniques and by bonding techniques. The remarks made above relative to the frictonal features apply to this embodiment also. For example, the protuberances 44 may be provided on the arms and the tubular elements may be dimensioned so that they engage the edges of the arms or one or the other of these features may be eliminated. In this embodiment, it is seen that the two vertical rows of teeth face in opposite directions.

FIG. 7 and FIG. 8 show a third embodiment of the shade guide. In this embodiment, there is but a single vertical row of teeth which are retained by a shank consisting of an inner molded member 46, which is preferably of a plastic material, and a sheet metal element 48 wrapped around the inner member in the manner shown. The inner member is molded in such a way that it has a plurality of formations, as indicated by numerals 52, 54 and 56, which are adapted to abut against the inner surface of the sheet metal element 48 for the purpose of providing passages for the arms and for retaining them in position. The sheet metal element is provided with a series of slots 50 which coincide with the spaces between the formations 52 permitting entry of the arms 28. The remarks made above relative to the frictional features of retaining and aligning the arms also apply to this embodiment. For example, the arms may be provided with the protuberances 44 and the passages may be so dimensioned as to frictionally engage the edges of the arms, or alternatively either features may be eliminated.

In addition, the surface 55 may be made to converge relative to the sheet metal element to accentuate the frictional contact with the protuberances 44 on the arms. The shank is adapted to be secured to a base 14, as seen in FIG. 2, by suitable means as by bonding. In this embodiment, as in the embodiments described above, the base is provided with the sealing formation 16. It is also contemplated within the scope of this invention to arrange two of the shank units of the third embodiment back-to-back so that the teeth of each vertical row face in opposite directions, and to mount the shank units to a base 14 provided with a sealing formation 16 as seen in FIG. 2.

Thus, it is seen that by this invention there is provided a shade guide unit which retains the shade guide teeth in a clean, sterilized condition when not in use and wherein the teeth are protected from light, which affects the color of the plastic teeth; and wherein the shade guide is supported and protected from damage when not in use and is in a position such that it may readily be withdrawn from the sterilizing tank for immediate use. Moreover, the shade guide is of such a construction that it provides a lid for the tank and prevents dust, dirt and the like from entering the tank. It provides for an excellent display of the shade guide teeth in longitudinal rows and the construction is such that the shade guide teeth are retained in and prevented from falling out of the shade guide shank but may be readily withdrawn manually when desired.

It should be understood that the invention is not limited to the precise details herein illustrated and described since the same may be carried out in other ways falling within the scope of the invention as claimed.

I claim:
1. A dental shade guide unit comprising dental shade guide elements, a tank for housing said elements, a closure cap for said tank, a support for the shade guide elements secured to the inside of said closure cap and extending into the tank, said support comprising a generally flattened elongated intermediate wall member, elongated flattened end members having transverse slots formed in one side thereof, said end members positioned on each side of said wall member and secured thereto with the slotted sides abutting the same to form an array of openings supporting an array of said shade guide elements on each side of said wall member, the walls of said openings along the length of said slots being flexible, the dimension of the opening being slightly smaller than the dimension of the portion of the shade guide element which is inserted therein to thereby frictionally hold said dental shade guide elements in an array on each side of said support.

2. A dental shade guide unit as claimed in claim 1 wherein said dental shade guide elements have a tapered end portion for insertion into said openings, said tapered portion increasing in dimension towards the shaded portion of the shade guide element and cooperating with the walls of the openings for better gripping action.

References Cited
UNITED STATES PATENTS

| | | | |
|---|---|---|---|
| 728,444 | 5/1903 | Cox | 206—63.3 |
| 1,078,431 | 11/1913 | Grier | 206—83 |
| 1,704,723 | 3/1929 | Charen | 206—83 |

LOUIS G. MANCENE, *Primary Examiner.*

C. R. WENTZEL, *Assistant Examiner.*